United States Patent Office 2,861,054
Patented Nov. 18, 1958

2,861,054
WATER REPELLENTS TECHNIQUES

John B. Rust, Verona, and William B. Canfield, Montclair, N. J., assignors, by direct and mesne assignments, of one-half to Montclair Research Corporation, Montclair, N. J., a corporation of New Jersey, and one-half to Ellis-Foster Company, a corporation of New Jersey No Drawing. Application June 3, 1953
Serial No. 359,427

15 Claims. (Cl. 260—70)

This invention relates to methods for the production of water repellents particularly of water-dispersible character, to the products thus obtained, and to their utilization particularly in the treatment of textiles.

Various types of water repellents have been suggested for treatment of fabrics and textiles to produce water-repellent materials. Due to instability of many of such preparations in the presence of moisture, anhydrous solvents were necessary. Such products exhibited frequently a short self life. Some of the prior art products resulted in tendering of cloth to which they were applied.

Among the objects of the present invention are included the production and utilization of water repellents that are water-dispersible.

Further objects include products that are water-stable and give water-stable finishes.

Still further objects include the textiles of improved water repellency and substantial resistance to laundering, and to methods of making such treated textiles and the compositions for use thereon.

Still further objects and advantages will appear from the more detailed description set forth below given by way of illustration and not by way of limitation since various changes therein may be made by those skilled in the art without departing from the scope and spirit of the invention.

In accordance with the present invention, methods have been developed for the production of novel water-dispersible materials of value for imparting water-repellency to textiles, fabrics, and cloth by reaction of a higher fatty acid amide, a formaldehyde yielding substance, a carbamide moiety, and a taurinating agent. As pointed out below various methods of reacting these materials may be utilized. Such products are particularly useful as water-repellents for treating textiles and fabrics but may also be useful as coating compositions to cover textiles and fabrics. In such utilizations, these water-repellents may be suspended in water or other aqueous media and used to impregnate the textile or fabric as by immersion or padding techniques. Upon heating at elevated temperatures, a water-repellent durable finish is obtained.

The fatty acid amide used may be any of the higher or long chain fatty acid derivatives. They desirably should contain at least nine carbon atoms and preferably eighteen or more including 20, 22, 24 carbon atoms and higher. Exemplary fatty acid amides are stearamide, palmitamide, lauramide, methylene distearamide, ethylene distearamide, etc.

Any substance yielding formaldehyde may be used as an initial reactant such as aqueous formaldehyde, paraformaldehyde, methylal, hexamethylenetetramine, etc.

The carbamid moiety is defined as a compound or mixture of compounds containing the grouping

$NH_2C=X.NR$ in which X may be an ONS group e. g. oxygen, NH, or sulfur as in derivatives of urea, thiourea, and guanidine including such compounds and mixtures containing them of urea, thiourea, guanidine, dicyanidiamine, melamine, alkylolmelamines, polyalkoxy methyl melamines. In the latter types of compounds the alkyl groups are desirably lower alkyls as from 1 to 5 carbon atoms. These more complex products can be made in any desired way as by including the nitrogenous compound in an initial reaction stage with the fatty acid amide and formaldehyde yielding substance, or by reacting the nitrogenous compound with formaldehyde to give a polymethylol derivative such as hexamethylol melamine which is then heated with the fatty acid amide with or without additional formaldehyde yielding substance, etc., or by reacting the fatty acid amide with a polyalkoxy methyl derivative of the nitrogenous compound such as hexaethoxy methyl melamine, with or without added formaldehyde yielding substances, and completing the reactions by heating with secondary amine, etc.

The taurinating agent is a taurine compound or derivative which will react with and confer sufficient hydrophilic properties to the basic water repellent composition e. g. the hydrophobic methylolated melamine-stearamido compound or other higher fatty acid amide-formaldehyde-carbamid moiety reaction product to enable preparation of well dispersed aqueous padding baths without affecting water repellency after cure and without having a deleterious effect on the cloth. The taurinating agent includes taurine and its derivatives, e. g. amino alkyl sulfonic acids and their N- or other substitution products particularly where the N- or other substituent is desirably a lower alkyl such as methyl, ethyl, etc. The amino alkyl sulfonic acid may be aminoethyl sulfonic acid (taurine), amino propyl sulfonic acid, and any corresponding higher sulfonic acids which in the form of their water soluble salts such as the alkali metal salts e. g. sodium, potassium, ammonium, etc., will give the desired water dispersibility. A mono-N-alkylated taurine specifically N-methyl taurine is preferred and will be used to illustrate the invention, but other taurines may be substituted therefore in the examples as exemplified below, for example, taurine higher homologues of taurine such as amino-propyl sulfonic acid etc. While alkali metal salts are specifically illustrated other inorganic or organic bases may be used such as alkylolamines including mono, di, and trialkylolamines illustrated by triethanolamines and other, particularly lower alkyl, alkylolamines, e. g. specifically up to butyl being desirable.

The reactions may be carried out by successive steps of reaction for example where the formaldehyde reacting substance and melamine or other carbamid moiety are first reacted to form a hexamethylolmelamine or other methylolated derivative, the latter then reacted with stearamide or other higher fatty acid amide in molar ratios desirably of 2 of fatty acid amide to 1 of the melamine etc. derivative, followed by reaction of the methylolated melamine (or other carbamido) stearamido (or other higher fatty acid amido) monomer or reaction product with the taurinating agent. Or the reactants other than the taurinating agent may be reacted simultaneously followed by taurination. Or all reactants including the taurinating agent may be reacted simultaneously.

Structurally it is believed the process may be represented as follows without any intended limitation by theory of reaction, the carbamid moiety being melamine, the fatty acid amide being stearamid, and the taurinating agent being N-methyl taurine.

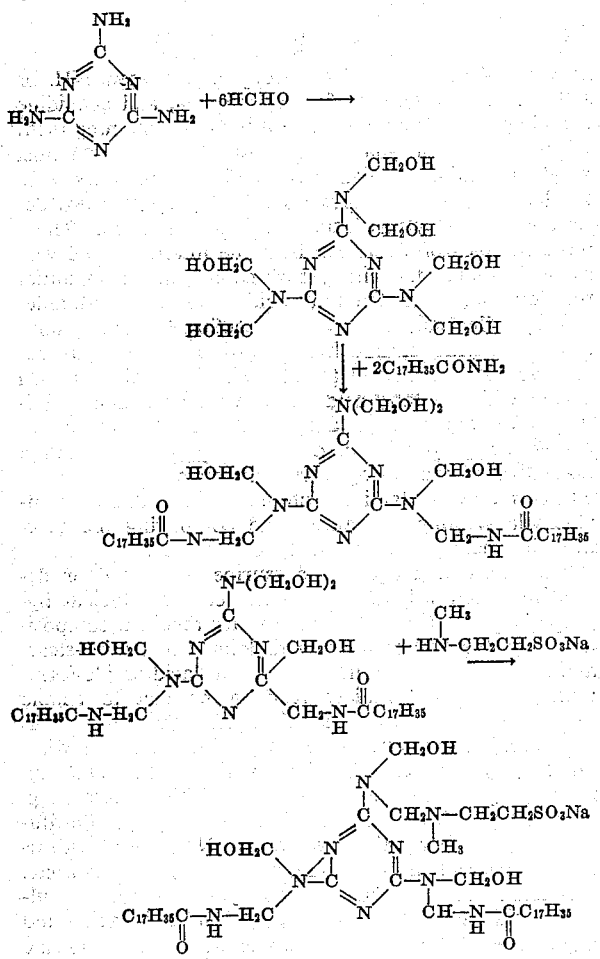

Upon curing in the presence of an acid catalyst it may well be that the taurine portion is split out of the compound. On the other hand, if it is not split out, it is apparent that as the methylolated melamide-stearamido monomer cures to form a three dimensional network, the dispersing effect of the taurine is overcome or at any rate is no longer apparent.

The above mechanism is illustrative, but it may serve to point up the fact that the taurine derivative is not simply an auxiliary dispersing agent but that it is an integral part of the molecule.

The process and product may be modified by inclusion of various other types of reactants for particular purposes. Thus a secondary amine such as morpholine may be included. The presence of some secondary amine such as morpholine may give a somewhat smoother dispersion, but it is not essential. The secondary amine may vary and includes alkyl and alkylolamines desirably of alkyls of not more than five carbons such as diethylamine, di-butylamine, etc., dialkylolamines such as diethanolamine, cyclic amines containing both five and six membered rings including morpholine, piperidine, and the like, particularly heterocyclics like piperidine and lower carbon containing compounds.

Besides the active ingredients of the water repellents of the present invention, use may be made of mixtures of the active ingredients with waxes or metallic soaps such as candelilla wax, montan wax, carnauba wax, mineral wax and the like, and aluminum stearate, zinc stearate, barium stearate, aluminum palmitate, strontium stearate, cerium stearate, lead stearate, strontium palmitate and the like. Effective water-repellent compositions have been prepared without the presence of candelilla wax.

In order to allow these products to be more easily handled they may be made into a paste with water, alcohols such as methanol, ethanol, isopropanol, propanol, and the like, dioxane, ethyl acetate, xylene and the like. Such plates are readily emulsifiable and their water dispersions impart excellent water-repellent characteristics to textile fibers.

Any of these stated additives including secondary amines, waxes, etc. may be used in any of the methods referred to above.

The preferred molar ratios of the principal reactants include reaction of 2 moles of fatty acid amide with 1 mole of carbamid moiety, and of 1:1 moles of taurine derivative with carbamide moiety-reaction product. But these ratios may vary substantially as for example for taurinating agent to carbamid moiety component of 3:1 to 1:3 molar. The amounts of secondary amines and waxes may vary widely. The formaldehyde component may be in amount to partially or fully methylolate the carbamid moiety or in excess thereof. The amount of secondary amine when used may be a molar ratio of 1:1 with the carbamid moiety but may vary in either direction for example 3:1 to 1:3. The wax may be about 50% by weight on the fatty acid amide but may vary substantially for example from 10% or less to 300% or more.

The reaction products are made by heating the stated reactants at moderate temperatures for example from 60-90° C., although higher temperatures as for example refluxing temperatures may be used. The reactions may be carried out under anhydrous conditions as in the preparation of the methylolated-carbamido moiety-fatty acid amide complex for reaction separately with the taurinating agent, but anhydrous conditions are not essential although somewhat longer reaction times may be necessary. In aqueous media, dispersions may be produced directly during reaction.

The water dispersible products may be used to impregnate textiles or fabrics in any desired way. Dispersed in water or other aqueous media they may be applied by immersion or padding. Any concentrations may be used for this purpose, from 1-10% by weight, of the water repellent material being satisfactory although other concentrations may be used. Agitation in water at 70-80° C. may be used to produce the dispersion. The amount deposited on the textile or fabric will vary with the ultimate result desired. From 1 to 10% by weight on the fabric or textile is usually ample. After impregnation, excess may be removed as by squeezing, and the fabric or textile dried. Any desired drying operation may be used. For example, 15-20 minutes at 60° C. may be used, or higher temperatures with or without circulating air currents may be used, for instance 1-2 minutes at 100-110° C. in a current of air. After drying usually at a temperature of from 60-120° C. for up to 10 minutes, a curing treatment is desirable by heating to set the material generally at from 120° to 200° C. for from 1 to 10 minutes. Such heating is usually at a temperature above that of drying, for instance 140-145° C. for about 15 minutes, or at 160-165° C. for from 2 to 5 minutes, or 170° C. for one minute. The conditions of curing depend on factors such as temperature, time of heating, character of reaction products, etc. Curing conditions are not critical. The preferred conditions would range between 2 to 10 minutes at 200-400° F. Temperatures as high as 450° F. can also be used with a corresponding smaller time interval, e.g., ca. 30 seconds.

Water repellency is obtained which is fast to both dry cleaning and washing with soap. The water repellent materials are stable to moisture and exhibit substantial shell-life.

The products of the present invention are compatible with and may be blended with synthetic resins such as urea-formaldehyde, melamine-formaldehyde, and the like, as well as with natural or synthetic waxes to impart advantageous properties to treated fabrics in addition to water-repellency.

The following examples illustrate the invention, parts being by weight unless otherwise indicated.

Example I

A water-repellent material was prepared by charging a 5 liter, 3-neck flask, equipped with a stirrer, reflux condenser, thermometer and dropping funnel with the following materials:

| | Grams |
|---|---|
| Melamine | 189 |
| Paraformaldehyde | 285 |
| Morpholine | 130.6 |
| Stearamide | 849 |
| Candelilla wax | 424.5 |
| n-Propanol | 750 |

The mixture was heated on a water bath at 80–90° C. for a period of 3 hours. 741.0 grams of a 32.6% aqueous solution of the sodium salt of N-methyl taurine were then added slowly over a period of ½ hour and the resulting solution was heated for an additional hour at 80–90° C. The resulting product was water dispersible and contained 59% active material.

150 grams of the above product were mixed with 130.5 grams of water at 80° C. to form a smooth paste containing 31.5% active material. The paste was then homogenized and padding baths of varying strengths were prepared by diluting the 31.5% active paste with water containing 5% each (based on the weight of paste) of urea and ammonium chloride. Swatches of 9 ounce cotton sateen were padded at 25° C. with the various solutions and after drying for 15 minutes at 60° C. the treated swatches were cured at 150–155° C. for 5 minutes. The results obtained were as follows:

| Padding batch | Percent active in bath | Pickup, wet basis, percent | | Spray rating | |
|---|---|---|---|---|---|
| | | Total | Active | Neutralized | 2 hr. laundering |
| A | 6.3 | 60 | 3.78 | 100 | 100 |
| B | 5.4 | 66 | 3.57 | 100 | 90 |
| C | 5.0 | 65.6 | 3.28 | 100+ | 80 |
| D | 3.8 | 67.2 | 2.55 | 90 | 80 |

Example II

In order to determine the effect of varying the curing conditions, 250 grams of the 31.5% paste prepared in Example I were dissolved in 812.5 g. of water at 25° C. and then further diluted with a solution containing 18.75 g. each of urea and ammonium chloride in 150 g. of water. The percent active material in the final bath was 6.3%.

6 swatches of 8 ounce cotton Oxford cloth were padded at 25° C. by reversing the cloth in the bath. The treated swatches were dried at 200° F. for 3 minutes and then cured at either 330° F. or 365° F. for varying periods of time. Spray ratings were taken on both sides of the swatches. The results obtained were as follows:

| Swatch | Pick-up, wet basis, percent | | Cure, min. | | Spray rating | | | |
|---|---|---|---|---|---|---|---|---|
| | Total | Active | 330° F. | 365° F. | Neutralized | | Laundering | |
| | | | | | Side A | Side B | Side A | Side B |
| 1 | 55.6 | 3.50 | 5 | | 90 | 100 | 70 | 70 |
| 2 | 57.6 | 3.63 | 7 | | 90 | 100 | 70 | 70 |
| 3 | 57.3 | 3.61 | 9 | | 90 | 100 | 70 | 70 |
| 4 | 53.7 | 3.38 | | 3 | 90 | 100 | 70 | 70 |
| 5 | 57.6 | 3.63 | | 5 | 90 | 100 | 70 | 70 |
| 6 | 56.8 | 3.58 | | 7 | 90 | 100 | 70 | 70 |

Example III

A water-repellent material was prepared in the same manner described in Example I, except that no morpholine was used in the composition. A solution containing 61.4% active material was obtained. 1079.5 g. of the material obtained was treated with 918.5 g. of water and the system homogenized to yield a paste containing 33.2% active ingredients.

120 grams of this paste were diluted with 290 g. of water and then with 72 g. of water containing 9 g. each of ammonium chloride and urea to yield an 8% passing bath (Bath A). A second padding bath was prepared by diluting 120 g. of the paste with 305 g. of water and then with 60 g. of water containing 7.5 g. each of ammonium chloride and urea (Bath B). A swatch of 9 ounce cotton Oxford was padded with each of the above solutions, dried at 200° F. for 3 minutes and then cured at 330° F. for 5 minutes. The results obtained were as follows (spray ratings were taken on both sides of the swatches):

| Bath | Pick-up, wet basis, percent active | Spray ratings | | | | Dry cleaned | |
|---|---|---|---|---|---|---|---|
| | | Neutralized | | Laundered | | | |
| | | Side A | Side B | Side A | Side B | Side A | Side B |
| A | 4.47 | 100 | 100 | 70 | 70 | 80 | 80– |
| B | 4.45 | 90 | 100 | 70 | 70 | 70 | 70+ |

Example IV

A water-repellent base material was prepared by reacting 95.0 parts paraformaldehyde, 63.0 parts melamine, 87.1 parts morpholine, 283 parts stearamide 141.5 parts candelilla wax and 592 parts of anhydrous ethanol in a reaction vessel equipped with a thermometer, stirrer, and a condenser set for distillation. The system was heated to the boiling point and the water formed during the reaction was continuously removed via the alcohol distillation. In the early stages of the distillation additional ethyl alcohol was added to the reaction mixture to maintain the volume. After continuous distillation for 1 hour, 400 parts of dioxan was added and distillation continued for an additional 1¼ hours. The continuous distillation was then stopped and the reaction product (1043 parts and containing 52.8% active material) was then cooled.

100 parts of the above base was transferred to a reaction vessel equipped with a thermometer, stirrer and reflux condenser and heated on a water bath, while stirring, to a temperature of 75° C. 20.7 parts of a 35% aqueous solution of the sodium salt of N-methyl tuarine was then added and the resulting solution heated for ½ hour at 80–85° C. The final solution was easily dispersible in water and had a solids content of 48.9%.

A 5% padding bath was prepared by dispersing 10 parts of the final solution in 98 parts of warm water containing 0.5 parts of ammonium chloride. A square of 9 ounce cotton sateen was padded with the solution and after drying at 50° C. was cured at 158° C. for 4½ minutes. The spray ratings obtained were 100 after neutralization and 90 after laundering.

Example V

A water-repellent material was prepared by reacting in a 3-neck flask, equipped with a thermometer, stirrer and reflux condenser, the following materials:

| | |
|---|---|
| Melamine | 12.6 parts. |
| Stearamide | 56.6 parts. |
| Candellila wax | 28.3 parts. |
| N-methyl taurine, soduim salt | 32.2 parts (99 parts of a 32.6% aqueous solution). |
| Formaldehyde, 37% | 48.7 parts. |
| Isopropanol | 50.9 parts. |

The temperature of the mixture was maintained at 85° C. for 2½ hours. The final material was dispersible in hot water and contained 50% active material. A 25% active paste was prepared by homogenizing a 1:1 mixture of the above material and water. A 6% padding bath was prepared by dissolving 24 parts of the 25% active paste in 74 parts of water containing 1 part of urea and 1 part of ammonium chloride. A swatch of 9 ounce cotton sateen was padded, dried at 50° C. and cured at 158° C. for 4 minutes. The spray ratings obtained were 80+ after neutralization and 80+ after laundering.

*Example VI*

100 parts of a water-repellent base material containing melamine, paraformaldehyde, morpholine, stearamide, candelilla wax and dioxan, prepared in a similar fashion to that described in Example IV but containing 49.1% active material, was placed in a reaction vessel equipped with a thermometer, stirrer, and reflux condenser. The base material was heated to 70° C. on a water bath and a solution containing 5.3 parts of taurine (2-amino ethane sulfonic acid), 1.73 parts of 97.5% sodium hydroxide, and 11 parts of water was heated for 2 hours at 78–80° C. At the conclusion of the reaction the material was water-dispersible and contained 47.5% active material. A 6% padding solution was prepared by treating 12.6 parts of the reaction mixture with 50 parts of hot water and then with 25.4 parts of water containing 1 part ammonium chloride and 1 part urea. A good dispersion was obtained. A swatch of 9 ounce cotton sateen fabric was padded, dried at 50° C. and then cured at 158° C. for 4 minutes. A spray rating, after neutralization, of 90 was obtained, which dropped to 80+ after laundering for 2 hours.

*Example VII*

Example VI was repeated, except that 5.9 parts of 3-amino propane sulfonic acid was used instead of 2-amino ethane sulfonic acid. The final solution was heated for 4 hours at 78–80° C. A pale tan emulsion was obtained containing 47.5% active material.

A portion of the hot emulsion was treated with an equal weight of hot water and the resulting paste, on cooling, was homogenized to yield a homogeneous 23.6% active paste.

25.4 parts of the paste was dissolved in 62 parts of warm water and 12.5 parts of a catalyst solution consisting of 1.25 parts each of ammonium chloride and urea dissolved in 10 parts of water, to obtain a 6% active padding solution. When a swatch of 9 ounce cotton sateen fabric was padded, dried at 50° C. and cured at 160° C. for 3 minutes, a spray rating of 100 was obtained after neutralization, which dropped to 80+ after laundering for 2 hours.

In these examples any of the stated carbamide derivatives may be substituted for the melamine, and other fatty acid amides used in lieu of stearamide, using corresponding proportions.

While the invention as illustrated above desirably employs a carbamid moiety in producing the water repellent, products may be produced without any carbamid moiety. The following example is sufficiently exemplary.

*Example VIII*

226 parts of stearamide, 216.8 of 99% isopropanol, and 24 parts of paraformaldehyde were heated together at 80° C. for 5 hours. To the reaction product, the sodium salt of N-methyl taurine was added in the molar 1:1 ratio using a 36.2% aqueous solution and heating continued. A paste dispersible in water was obtained and may be used as a water repellent. The various fatty acid amides and taurinating agents may be similarly used.

Having thus set forth our invention, we claim:

1. The method of making water dispersible water repellents which consists essentially in heating a carbamido compound selected from the group consisting of ureau, thiourea, guanidine, dicyandiamine, and melamine, a fatty acid amide of at least nine carbon atoms having replaceable hydrogen on the nitrogen, and a water soluble amino lower alkyl sulfonic acid, in the presence of formaldehyde, to form a water dispersible water repellent resulting from the reaction of the stated components in the molar ratios of 1–3 moles of said carbamido compound, 2 moles of fatty acid amide per mole of carbamido compound, 1 to 3 moles of aminoalkyl sulfonic acid per mole of carbamido compound and formaldehyde to methylolate the carbamido compound.

2. The method of making water dispersible water repellents which consists essentially in heating melamine, a fatty acid amide of at least nine carbon atoms having replaceable hydrogen on the nitrogen, and a water soluble amino lower alkyl sulfonic acid, in the presence of formaldehyde, to form a water dispersible water repellent resulting from the reaction of the stated components in the molar ratios of 1–3 moles of melamine, 2 moles of fatty acid amide per mole of melamine, 1 to 3 moles of aminoalkyl sulfonic acid per mole of melamine, and to methylolate the melamine.

3. The method of claim 2 in which the amino alkyl sulfonic acid is N-lower alkyl mono-alkylated.

4. The method of claim 2 in which the amino alkyl sulfonic acid is added in the form of the sodium salt of N- methyl taurine.

5. The method of claim 2 in which a wax is present during the heating.

6. The method of claim 2 in which a secondary amine is present during the heating.

7. The method of claim 2 in which the reactants other than melamine are heated to form a hydrophobic reaction product which is heated with the aminosulfonic acid to convert the hydrophobic reaction product into a hydrophyllic reaction product.

8. The method of claim 7 in which the hydrophobic reaction product is produced in an anhydrous medium.

9. The method of claim 7 in which the hydrophobic reaction product is produced in an aqueous solution medium and reaction with the aminosulfonic acid produces a dispersion.

10. A water-dispersible carbamido compound—formaldehyde-fatty acid amide—amino lower alkyl sulfonic acid reaction product the carbamido compound being selected from the group consisting of urea, thiourea, guanidine, dicyandiamide, and melamine, the fatty acid amide having at least nine carbon atoms and having replaceable hydrogen on the nitrogen, and the sulfonic acid being water soluble, in the molar ratios of 1 to 3 carbamido compound, 2 of acid amide per mole of carbamido compound, 1 to 3 of sulfonic acid per mole of carbamido compound, and formaldehyde to methylolate the carbamido compound.

11. A water - dispersible melamine—formaldehyde-fatty acid amide—amino lower alkyl sulfonic acid, the fatty acid amide having at least nine carbon atoms and having replaceable hydrogen on the nitrogen, and the sulfonic acid being water soluble, in the molar ratios of 1 to 3 melamine, 2 of acid amide per mole of melamine, 1 to 3 of sulfonic acid per mole of melamine, and formaldehyde to methylolate the melamine.

12. The reaction product of claim 11 including a wax in an amount of from 10% to 300% by weight on the fatty acid amide.

13. The reaction product of claim 12 including a secondary amine in the molar ratio of 1:3 per mole of melamine.

14. The reaction product of claim 11 including a secondary amine in the molar ratio of 1:3 per mole of melamine.

15. The reaction product of claim 11 in which the amino alkyl sulfonic acid is N-methyl taurine and the fatty acid amide is stearamide.

References Cited in the file of this patent

UNITED STATES PATENTS

| | | |
|---|---|---|
| 2,357,273 | Thurston | Aug. 29, 1944 |
| 2,377,868 | D'Alelio | June 2, 1945 |
| 2,537,667 | Harris | Jan. 9, 1951 |
| 2,547,728 | Abrams | Apr. 3, 1951 |

FOREIGN PATENTS

| | | |
|---|---|---|
| 628,818 | Great Britain | Sept. 6, 1949 |